Feb. 23, 1965
N. SOLODUCHA
3,170,771
APPARATUS FOR CONTINUOUS DIGESTION
OF TITANIUM BEARING MATERIALS
Filed Jan. 30, 1961
2 Sheets-Sheet 1
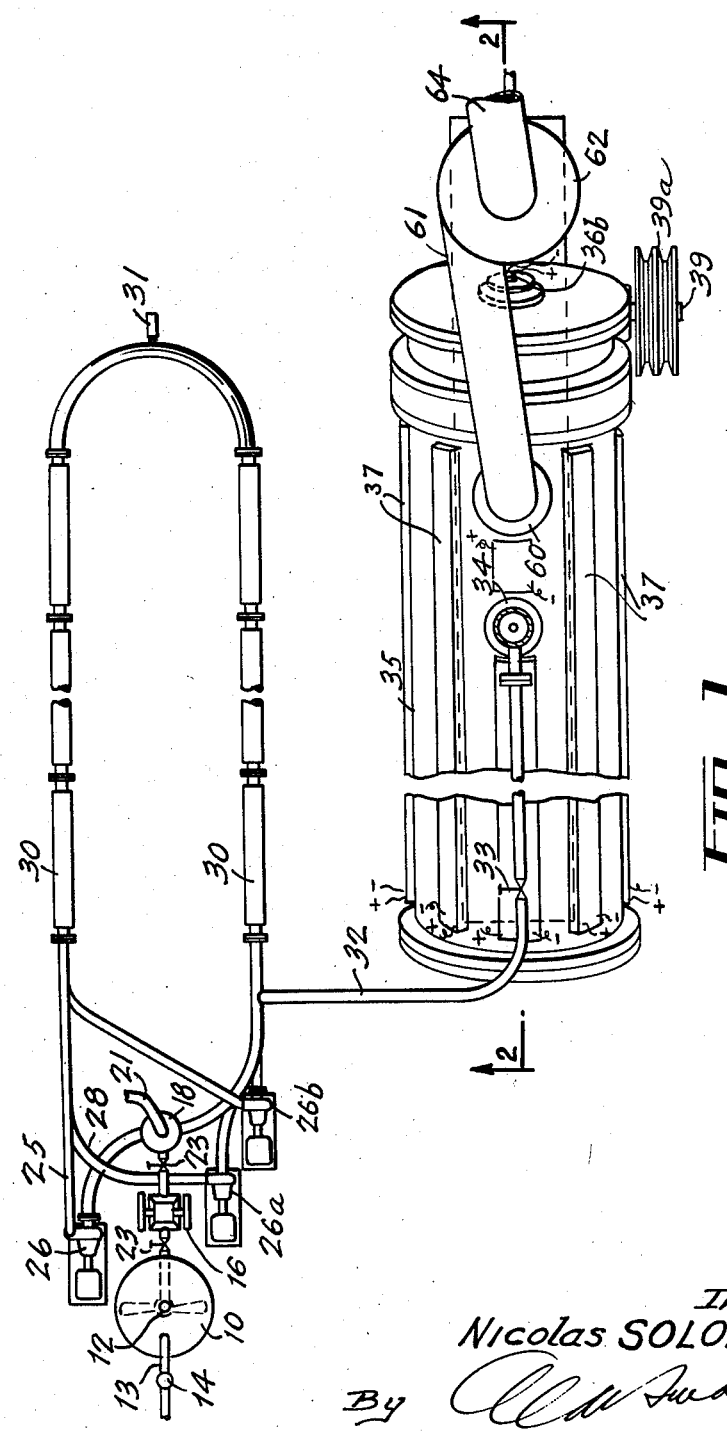
Inventor
Nicolas SOLODUCHA
By
Attorney Feb. 23, 1965 N. SOLODUCHA 3,170,771
APPARATUS FOR CONTINUOUS DIGESTION
OF TITANIUM BEARING MATERIALS
Filed Jan. 30, 1961 2 Sheets-Sheet 2
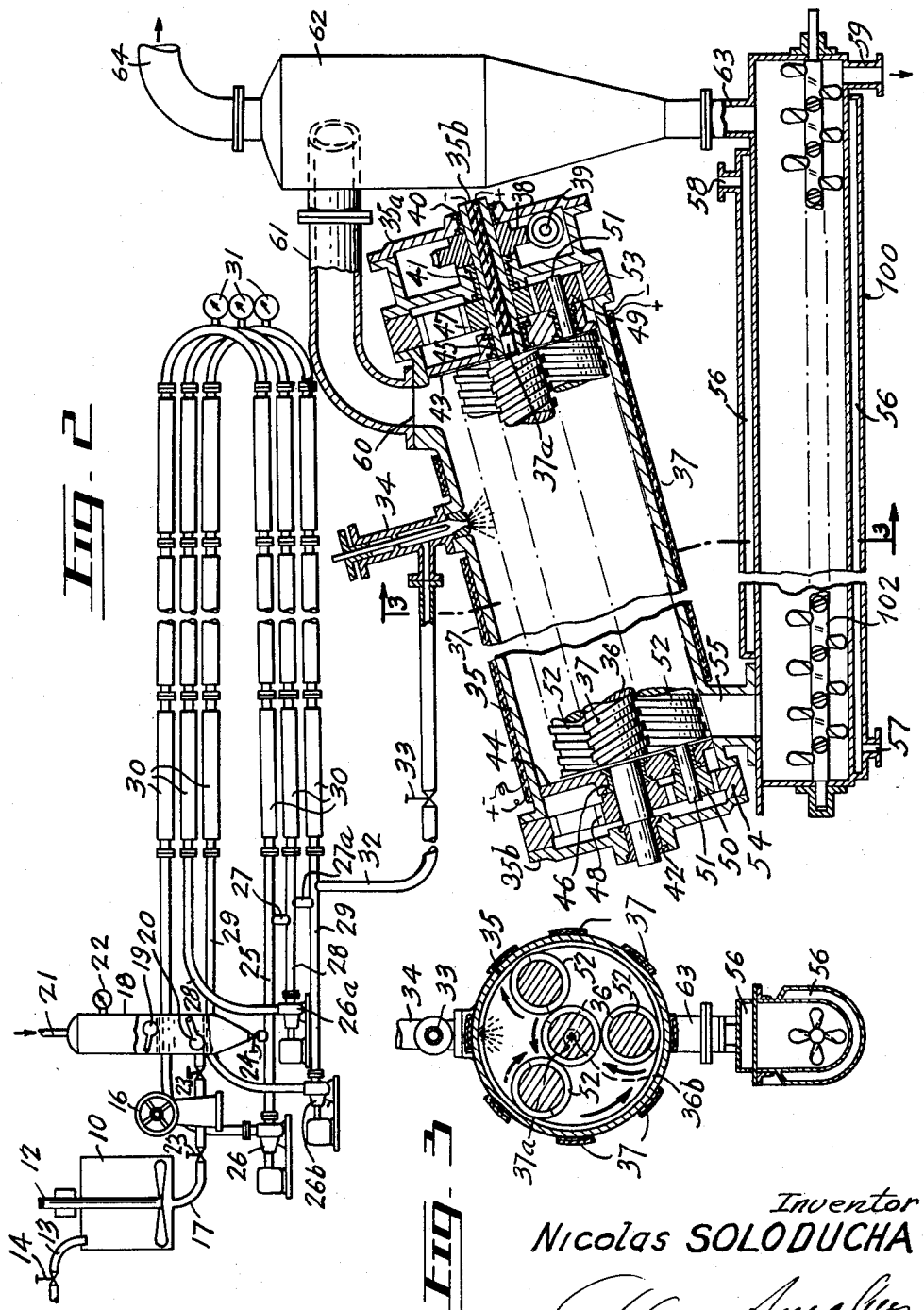
Inventor
Nicolas SOLODUCHA
By [signature]
Attorney

3,170,771
APPARATUS FOR CONTINUOUS DIGESTION OF TITANIUM BEARING MATERIALS
Nicolas Soloducha, Montreal, Quebec, Canada, assignor to Continental Titanium Corp. (N.P.L.), Montreal, Quebec, Canada
Filed Jan. 30, 1961, Ser. No. 85,534
6 Claims. (Cl. 23—290.5)

This invention relates to a process for digestion of titanium bearing ores with sulfuric acid, and more particularly to a process and apparatus particularly suited for continuous digestion of leached titanium bearing material, or slag, with high titanium content, and with a very low content of ferrous material. The type of material described as "leached" is that from which, prior to digestion, the iron and other impurities have been removed by leaching or any other manner and which material, when digested with sulfuric acid, being only slightly exothermic, does not generate enough heat by reaction to reach the desirable temperature level.

The customary procedure of making titanium dioxide pigment from titaniferous material such as ilmenite is digestion with concentrated sulfuric acid. The resulting sulfates of titanium, iron and other metals are dissolved in water or diluted sulfuric acid, and titanium dioxide is precipitated by hydrolysis from the resulting sulfate solution. On a commercial scale, the digestion process is generally carried out as a batch operation. In such a batch operation, the titaniferous starting material is mixed with concentrated sulfuric acid and the resulting slurry is charged to a reaction vessel. Superheated steam is blown into the mass in order to raise its temperature to a value closely approximating that at which the sulfuric acid reacts with the titaniferous material. A small amount of water is then introduced into the heated mass to provide further local heating by dilution of the concentrated acid, and this local heating is sufficient to initiate the reaction between the acid and the titaniferous material. The exothermic heat of the reaction causes the initially local reaction to spread rapidly throughout the mass.

The product obtained at the end of the violent reaction described comprises a hard mass containing a major portion of the ore in the form of sulfates of titanium, iron and other metals. It is conventional practice to maintain the reaction product at an elevated temperature for a period of time sufficient to permit more of the titaniferous material to be converted to sulfates.

Although the batch digestion of the titaniferous material has been developed to the point where a large quantity of titaniferous material may be digested in this manner, it is impossible to digest in such a manner a leached titanium bearing material or slag with very high titanium content from which nearly all iron has been removed by leaching or smelting. For example, a leach product of titanium bearing material with the following analysis: $TiO_2$—87.52%, $FeO$—0.61%, $Fe_2O_3$—2.80%, $SiO_2$—1.44%, $MgO$—0.09%, $CaO$—0.09%, $Al_2O_3$—0.02%, $MnO$—0.01%, $Cr_2O_3$—0.01%, $V_2O_5$—0.01%, $P_2O_5$—0.009% and 7.40% of vocatiles, cannot be digested in such a manner, because the titanium bearing product mentioned above, from which iron oxides are removed, is only slightly exothermic in the reaction with sulfuric acid. Such a material must be heated not only to the reaction temperature of about 180-200 degrees C., but in addition must be strongly heated during the whole reaction (sulfatization) time. Therefore, the conventional apparatus commonly used in the conventional batch process digestion, since it does not lend itself to the supplementary heating required, cannot be used to digest the leach product mentioned above.

Although many patents have been issued on apparatus for continuous digestion with sulfuric acid of iron-titanium bearing material, some of which provide for supplementary heating devices during the sulfatization, none of these apparatus is suitable to digest the leached material mentioned above. By way of reference, some earlier patents showing processes and apparatus capable of continuous digestion are:

U.S. Patent No. 1,333,819—G. Jebsen—Mar. 16, 1920
U.S. Patent No. 1,977,208—B. D. Saklatwalla et al.—Oct. 16, 1939
U.S. Patent No. 2,098,025—J. E. Booge et al.—Nov. 2, 1937
U.S. Patent No. 2,098,026—J. E. Booge et al.—Nov. 2, 1937
U.S. Patent No. 2,098,054—F. H. McBerry—Nov. 2, 1937
U.S. Patent No. 2,098,055—F. H. McBerry—Nov. 2, 1937
U.S. Patent No. 2,557,528—E. W. Andrews—June 19, 1951

As mentioned above, none of these arrangements is suitable, or in fact capable, of continuous digestion of the leached material previously described.

The difficulties encountered in a continuous digestion operation with such material, in addition to the problem of heating previously mentioned, are those resulting from the physical conditions prevailing in the reaction mass.

During the course of the reaction between any titaniferous material and acid, the consistency of the reaction mass ranges from that of a fluid slurry, through a gummy and dough-like mass to, finally, at the end of the digestion reaction, a hard solid.

If a leached titanium product with very low iron content as mentioned above is digested, it goes through all phases from a fluid slurry through a gummy, dough-like mass and finally solid mass, but the period of heating required to bring the dough-like mass to solids is longer in view of the almost total reduction of exothermic reaction.

As a solution to this problem, the applicant has found that such titanium bearing material with very low iron content can be digested with sulfuric acid in a continuous operation, but it must be first strongly preheated before the fluid slurry starts to build a dough-like mass, and this can be achieved only at a pressure, with very thorough mixing. The slurry resulting from this pressurized preheating must be released at a suitable moment from the preheating unit and introduced into a digester, where again by strong heating, rolling, scraping, etc., as will be described in more detail later, the mass will quickly be brought to a solid powdered condition ready from dissolution. An apparatus capable of these steps for effective continuous digestion, in accordance with the invention, is shown in the accompanying drawings in which:

FIGURE 1 is a view in plan elevation of a continuous digestion apparatus in accordance with the invention embodying an interconnected arrangement of, a pressure preheating unit, a continuous cylindrical digester, a continuous baking apparatus embodying a paddle conveyor, and a collecting cyclone between the continuous digester and the continuous baking apparatus;

FIGURE 2 is a somewhat diagrammatic view in side elevation of the apparatus shown in FIGURE 1, with the continuous cylindrical digester of the invention and a continuous baking apparatus shown partially in section along the line 2—2 to illustrate the internal construction more clearly.

FIGURE 3 is a cross section of the apparatus shown in FIGURE 2 along the line 3—3 to illustrate the construction in more detail.

With reference to the drawings, the apparatus for digestion in accordance with the invention consists of two main parts, a preheating unit and a digester which are combined with a suitable baking apparatus as will be described below. The preheating unit is arranged in a similar manner as described in detail in the applicant's Canadian Patent No. 610,334, issued December 13, 1960, "Pressure Leaching Apparatus."

In order that the main elements of this preheater may be more clearly understood, reference will be made to the arrangement shown in FIGURES 1 and 2 wherein 10 represents a kettle with a stirrer 12 into which the predetermined mixture of titanium bearing material and concentrated acid is fed through the pipe 13. The flow to the kettle 10 is controlled by a valve 14 or any other suitable automatic controlling device.

The slurry thus prepared is drawn from the kettle 10 by the feeding pump 16 and is fed by the pump 16 through the pipe 17 to the expansion tank 18. The tank 18 simultaneously controls the level of the feeding and the pressure. In this tank a float 19 or any other suitable device controls the upper level of the liquid, and a float 20, the lower, by shutting off or switching on the feeding pump 16 when the liquid slurry passes the respective predetermined levels. Air or other suitable gas is supplied to tank 18 through the pipe 21 to maintain a predetermined pressure by means of an independent compressor (not shown).

Pressure gauge 22 is provided on the tank 18 and can be utilized to control pressure by being coupled to automatic means for controlling the compressor. Valves 23 are provided at either side of the pump 16 for shutting off the line in case of repairs or the like.

The liquid mixture is fed from the tank 18 through the pipe 24 into a first circulating line 25 of the preheating arrangement and is kept in circulation by a circulation pump 26 which maintains the required speed of from 3 to 6 feet per second to prevent the solid particles in the mixture from settling on the walls of the pipe. Through by-pass pipes 27, 27a, the feed slurry can be directed to a second 28 and a third 29 circulating line respectively. In these lines, the slurry is also kept in circulation at about the same speed as in the first circulating line 25 by means of circulation pumps 26a and 26b.

The purpose of these circulation lines (which can number as many as required) is to preheat the inflowing liquid slurry to and over the required reaction temperature as soon as possible, and to keep all slurry intensively mixed. Therefore, the circulation lines must be strongly heated through jacketed pipes 30, by suitable means for example steam or oil, or by electricity. A temperature gauge 31 indicates the temperatures in the circulation lines and as known, these gauges can be connected with some controlling devices to regulate in the jacketed pipes the feed flow of the heating medium from a suitable source (not illustrated).

Through the pipe 32, shut-off valve 33, and throttle sprayer valve 34, the heated or super-heated slurry thus created is then sprayed into the cylinder 35 of the cylindrical digester shown most clearly in FIGURE 2. The digester of the invention consists of a cylinder 35 wherein there is mounted for axial rotation a first hollow roller 36 having an external screw line thread 37. The roller 36 is driven by a worm gear 38 in meshed engagement with a worm shaft 39. The worm shaft 39 extends exteriorly of the cylinder end, as shown in FIGURE 1, and is provided with a suitable drive pulley or gear 39a to which a drive connection is made from a suitable power source, not illustrated.

As shown most clearly in FIGURE 2, the ends of the roller 36 are journalled in bearings 40, 41 and 42 mounted in the cylinder end portions 35a, 35b with the worm gear 38 disposed on the roller end 36b between the bearings 40, 41. A pair of driving disks 43 and 44 are mounted on the roller 36, one at each end. The disk 43 is provided with a bearing 45 and the disk 44 is provided with a bearing 46 so that the disks can rotate freely on the shaft ends of the roller 36.

Three auxiliary rollers 52 are mounted in circumferentially spaced apart relationship about and between the driving disks 43, 44 for rotation in combination with the central roller 36. As shown in FIGURE 1, the rollers 52 are also provided with external screw threads having a pitch opposed to that of the central roller 36. A pair of spur gears 47 and 48 are fixed, one at each end, to the shaft of the roller 36 and these are in meshed engagement with spur gears 49 and 50 fixed to the opposite ends of each shaft 51 of the rollers 52. Ring or internal gears 53 and 54 are provided at each end of the cylinder 35 between the ends of the cylinder wall and the end portions 35a, 35b and the respective spur gears 49, 50 on the rollers 52 are in meshed engagement with these ring gears and the spur gears 48, 50 of the central roller 36. With this arrangement, rotation of the central roller 36 as described causes an opposite rotation of the rollers 52 as indicated by the arrows in FIGURE 3, and the entire roller system is rotated within the cylinder 35.

The pitch diameters of the intermeshed spur gears and of all rollers must be always the same, and if the central roller 36 has a right-hand thread then the thread on the outside rollers 52 must be left-hand or vice versa, depending on the rotation.

In order that the titanium bearing material with very low iron content as described be digested, in addition to the heating in the preheater unit, the cylinder 35 of the cylindrical digester must also be heated to about 200–220 degrees C. This heating of the cylinder 35, and if required the central roller 36, is accomplished in any well-known suitable manner, for example electrically, using strip-type heating elements as indicated at 37 which are secured about the periphery of the cylinder 35. Similar elements 37a may be provided within the hollow core 36b of the roller 36 as shown in FIGURE 2.

When the liquid slurry of the titanium bearing material as mentioned above is heated under pressure to about 200–220 degrees C. in the preheater unit described, it is then sprayed into the cylinder 35 of the digester through an adjustable nozzle or jet arrangement 34, as shown in FIGURE 2, so that any water present evaporates immediately and the resultant doughy rubber-like mass is kneaded and turned by the rollers 36 and 52. Due to the inclination of the cylinder 35 and the cooperating external threads on the rollers, this mass is slowly moved down in the cylinder, and by further sulfatization through the increased temperatures and reaction is converted to a hard cake-like mass which is crushed between the rollers 36 and 52 into a powder and comes out through a discharge opening 55 into a suitable baking apparatus, for example as indicated at 100 in FIGURE 2. This baking apparatus consists essentially of a cylindrical chamber having mounted therein a screw conveyor 102 of the paddle type. The outer walls of the chamber are jacketed as indicated at 56 and inlet and outlet openings 57 and 58 are provided for the circulation of a heating medium. The powder delivered from the continuous cylindrical digester is then heated during its travel through the oven 100 for about two hours at about 200–220 degrees C. and finally is discharged through the outlet 59. The baked powder-like titanium sulfate then proceeds to further treatment such as cooling, to dissolution in water, clarification, reduction, filtering and hydrolysis.

The gases, mostly steam, which are developed during the reaction of the sulfatization can escape through the opening 60 on the top of cylinder 35 and pipe 61 to the cyclone 62 where any powdered titanium sulfate can settle through pipe 61 and opening 63 to the baking apparatus as described. The gases go from the pipe 64 to further cleaning such as a Cottrell type precipitator, scrubber or the like.

As will be appreciated by reference to the preceding description and accompanying drawings, the present apparatus is capable of supplying the continued supplementary heat required to successfully digest the leached titanium materials described and the described cylindrical digester is capable of continuously handling the material mass in its intermediate sticky dough-like stage, and following hard cake stage which is not possible with the previously proposed pug-mills or ball mills utilized in processing materials having a ferrous content of at least 15% or greater.

It will of course be understood that the apparatus described is equally suited to provide a means for continuous digestion for any ferro-titanium material which have not been leached as described and contains a higher percentage of iron. Since the known exothermic reactions supply the necessary heat, as is known in conventional batch processes, the supplementary heating in the preheating unit and the digester cylinder will be reduced accordingly.

I claim:

1. An apparatus for the continuous digestion of titanium bearing material or slag with low iron content, a continuous material heating and mixing unit having a plurality of pressurized and heated continuous conduit systems successively interconnected one to the other, and means to supply said titanium material and an acid mixture to a first of said continuous conduit systems, whereby said material is mixed with said acid and heated under pressure to reaction temperatures creating a liquid slurry; a continuous cylindrical digester having an elongated cylindrical shell, means to heat said shell, a plurality of kneading and conveying rollers mounted within said shell for concentric and planetary movement relative to the central axis of said shell with a first plurality of said rollers rotating about a central roller disposed along the central axis of said shell, means to rotate said rollers, a material inlet opening adjacent one end of said shell and a material outlet opening adjacent the other end of said shell, a conduit connection between said continuous heating and mixing unit and said shell material inlet opening terminating in a material injection nozzle adapted to discharge said material in fluid slurry form over said kneading rollers, the continued reaction of said material within said shell transforming said fluid slurry to a dough-like sticky mass and from said dough-like mass to a hard cake, said kneading rollers having cooperating external spiral threads adapted to knead and convey said mass in said dough-like form along the length of said shell and to continuously break said mass in said hard cake form to a powder form during the latter stage of said conveying action so as to discharge said powdered mass to said shell material outlet opening; and means to continuously cure said powdered material connected to said cylinder shell outlet opening.

2. An apparatus as claimed in claim 1, wherein the means to continuously cure the said powdered material comprises an elongated cylindrical baking kiln, a rotating paddle type conveyor mounted for rotation within said kiln, a material inlet opening at one end of said kiln connected to said cylindrical digester material outlet opening and a material outlet opening adjacent the other end of said kiln, and means to heat said kiln.

3. An apparatus as claimed in claim 2, including a cyclone collector having a top connection with said continuous cylindrical digester adjacent said material inlet end and a bottom connection with said baking kiln whereby titanium sulfate particles entrained in gases created within said cylindrical digester are collected and delivered to said powdered material mass within said baking kiln.

4. A cylindrical digester adapted for use in the continuous digestion of a preheated titanium material-acid mixture, comprising, an elongated cylindrical shell, means to heat said shell, a plurality of kneading and conveying rollers mounted within said shell, a central one of said rollers being mounted for rotation on the central axis of said cylinder, the remaining rollers being mounted in regular circumferentially spaced relationship to each other and regularly spaced radial relationship to said central roller, and gear means between said central roller, surrounding rollers and cylinder shell, whereby rotation of said central roller in one direction causes axial rotation of said remaining rollers in the opposite direction and orbital movement of said rollers about said central roller, means to rotate said rollers, a material inlet opening adjacent one end of said shell and a material outlet opening adjacent the other end of said shell, a material injection nozzle located in said material inlet opening adapted to discharge said titanium-acid mixture in fluid slurry form over said kneading rollers, the continued reaction of said material within said shell transforming said fluid slurry to a dough-like sticky mass and from said dough-like mass to a hard cake, said kneading rollers having cooperating external spiral threads adapted to knead and convey said mass in said dough-like form along the length of said shell and to continuously break said mass from said hard cake form to a powder form during the latter stage of said conveying action so as to discharge said powered mass to said shell material outlet opening.

5. A cylindrical digester as claimed in claim 4, wherein said cylinder is mounted with its central axis at an angle, said material inlet end being disposed at a higher level than said material outlet end.

6. A cylindrical digester adapted for use in the continuous digestion of a preheated titanium material-acid mixture, comprising, an elongated cylindrical shell, means to heat said shell, a plurality of kneading and conveying rollers mounted within said shell, a central one of said rollers being mounted for rotation on the central axis of said cylinder, the remaining rollers being mounted in regular circumferentially spaced relationship to each other and regularly spaced radial relationship to said central roller, and gear means between said central roller, surrounding rollers and cylinder shell, whereby rotation of said central roller in one direction causes axial rotation of said remaining rollers in the opposite direction and orbital movement of said rollers about said central roller, means to rotate said rollers, a material inlet opening adjacent one end of said shell and a material outlet opening adjacent the other end of said shell, a material injection nozzle located in said material inlet opening adapted to discharge said titanium-acid mixture in fluid slurry form over said kneading rollers, said cylinder being mounted with its central axis at an angle, said material inlet end being disposed above said material outlet end, the continued reaction of said material within said shell transforming said fluid slurry to a dough-like sticky mass and from said dough-like mass to a hard cake, said kneading rollers being adapted to knead and convey said mass in said dough-like form along the length of said shell and to continuously break said mass from said hard cake form to a powder form during the latter stage of said conveying action so as to discharge said powdered mass to said shell material outlet opening.

References Cited in the file of this patent

UNITED STATES PATENTS

| | | |
|---|---|---|
| 676,165 | Wacker | June 11, 1901 |
| 1,825,707 | Wagner | Oct. 6, 1931 |
| 1,959,765 | Saklatwalla et al. | May 22, 1934 |
| 2,509,379 | Vasel | May 30, 1950 |
| 2,674,104 | Street | Apr. 6, 1954 |
| 2,721,626 | Rick | Oct. 25, 1955 |
| 2,776,877 | Cardon | Jan. 8, 1957 |
| 2,849,289 | Zirngibl et al. | Aug. 26, 1958 |
| 2,944,877 | Marco | July 12, 1960 |
| 2,953,434 | McKinney et al. | Sept. 20, 1960 |
| 2,968,836 | Colombo | Jan. 24, 1961 |
| 3,018,170 | Soloducha | Jan. 23, 1962 |